(12) United States Patent
Lee

(10) Patent No.: US 12,288,859 B2
(45) Date of Patent: Apr. 29, 2025

(54) POWER STORAGE DEVICE

(71) Applicant: LG ENERGY SOLUTION, LTD., Seoul (KR)

(72) Inventor: Jin-Kyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 614 days.

(21) Appl. No.: 17/619,177

(22) PCT Filed: Jul. 10, 2020

(86) PCT No.: PCT/KR2020/009119
§ 371 (c)(1),
(2) Date: Dec. 14, 2021

(87) PCT Pub. No.: WO2021/015469
PCT Pub. Date: Jan. 28, 2021

(65) Prior Publication Data
US 2022/0359931 A1  Nov. 10, 2022

(30) Foreign Application Priority Data

Jul. 22, 2019 (KR) .......... 10-2019-0088484

(51) Int. Cl.
*H01M 10/6567* (2014.01)
*H01M 10/48* (2006.01)
*H01M 10/613* (2014.01)
*H01M 10/6556* (2014.01)

(52) U.S. Cl.
CPC ..... *H01M 10/6567* (2015.04); *H01M 10/486* (2013.01); *H01M 10/613* (2015.04); *H01M 10/6556* (2015.04)

(58) Field of Classification Search
None
See application file for complete search history.

(56) References Cited

U.S. PATENT DOCUMENTS

| 2012/0183822 | A1 | 7/2012 | Chung et al. |
| 2012/0231304 | A1 | 9/2012 | Kaiser et al. |
| 2012/0328964 | A1* | 12/2012 | Urata ................ H01M 8/04417 429/414 |
| 2017/0309979 | A1 | 10/2017 | Lee et al. |

(Continued)

FOREIGN PATENT DOCUMENTS

| CN | 102544625 A | 7/2012 |
| CN | 102576881 A | 7/2012 |

(Continued)

OTHER PUBLICATIONS

Machine translation CN107398049 (Year: 2024).*

(Continued)

*Primary Examiner* — Brian R Ohara
*Assistant Examiner* — M. T. Leonard
(74) *Attorney, Agent, or Firm* — Birch, Stewart, Kolasch & Birch, LLP

(57) ABSTRACT

An energy storage system includes a rack container having a predetermined accommodation space, a plurality of battery racks disposed in the rack container and respectively having a coolant tank in which a predetermined coolant is contained, and at least one flux supplement unit configured to connect the coolant tanks of the plurality of battery racks.

13 Claims, 11 Drawing Sheets

(56) References Cited

U.S. PATENT DOCUMENTS

| | | |
|---|---|---|
| 2018/0048037 A1 | 2/2018 | Newman |
| 2019/0077275 A1 | 3/2019 | Capati et al. |
| 2019/0393567 A1 | 12/2019 | Ju et al. |

FOREIGN PATENT DOCUMENTS

| | | | | |
|---|---|---|---|---|
| CN | 106450562 A | 2/2017 | | |
| CN | 106972207 A | 7/2017 | | |
| CN | 107069140 A | 8/2017 | | |
| CN | 107394308 A | 11/2017 | | |
| CN | 207098011 U | 3/2018 | | |
| CN | 108879005 A | 11/2018 | | |
| CN | 109103539 A | 12/2018 | | |
| CN | 208862127 U | 5/2019 | | |
| CN | 107398049 B | * 11/2020 | ............... | A62C 3/07 |
| CN | 102484297 A | 3/2025 | | |
| JP | 2014-216285 A | 11/2014 | | |
| JP | 2015-220177 A | 12/2015 | | |
| KR | 10-1256296 B1 | 4/2013 | | |
| KR | 10-2013-0104165 A | 9/2013 | | |
| KR | 10-1706717 B1 | 3/2017 | | |
| KR | 10-1761676 B1 | 7/2017 | | |
| KR | 10-2017-0121559 A | 11/2017 | | |
| KR | 10-2018-0092521 A | 8/2018 | | |
| KR | 10-2019-0001410 A | 1/2019 | | |
| KR | 10-1939812 B1 | 1/2019 | | |
| WO | WO-2017154462 A1 | * 9/2017 | ............... | A62C 3/16 |
| WO | WO 2018/185001 A1 | 10/2018 | | |

OTHER PUBLICATIONS

Machine translation WO2017154462A1 (Year: 2024).*
Extended European Search Report for European Application No. 20843688.1, dated Jun. 30, 2022.
International Search Report for PCT/KR2020/009119 mailed on Oct. 28, 2020.

* cited by examiner

POWER STORAGE DEVICE

TECHNICAL FIELD

The present disclosure relates to an energy storage system.

The present application claims priority to Korean Patent Application No. 10-2019-0088484 filed on Jul. 22, 2019 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery pack or a battery rack by using at least one battery module and adding other components. Here, according to various voltage and capacity requirements, an energy storage system may be configured to include at least one battery rack that includes at least one battery module.

In the battery rack of the conventional energy storage system, when an abnormal situation occurs in at least one battery module among a plurality of battery modules inside the rack case, ignition may occur at the battery module where the abnormal situation occurs.

In the case where ignition occurs in any one battery module, if flame and heat propagate to adjacent battery modules, it may lead to additional ignition, resulting in serious property damage or great personal injury.

Therefore, there is a need to find a way to provide an energy storage system that may more quickly prevent propagation of flame and heat to adjacent battery modules when ignition occurs in at least one battery module among battery modules.

DISCLOSURE

Technical Problem

The present disclosure is directed to providing an energy storage system, which may more quickly prevent propagation of flame and heat to adjacent battery modules when ignition occurs in at least one battery module among battery modules.

Technical Solution

In one aspect of the present disclosure, there is provided an energy storage system, comprising: a rack container having a predetermined accommodation space; a plurality of battery racks disposed in the rack container each of the plurality of battery racks having a coolant tank in which a predetermined coolant is contained; and at least one flux supplement unit configured to connect the coolant tanks of the plurality of battery racks.

Each of the plurality of battery racks may include a plurality of battery modules stacked on each other in a vertical direction of the battery rack each of the plurality of battery modules having at least one battery cell; a rack case configured to accommodate the plurality of battery modules, the coolant tank being provided to an upper side of the rack case; a pipe configured to connect the coolant tank and the plurality of battery modules; and a valve provided between the pipe and the coolant tank and configured to be opened when at least one battery module of the plurality of battery modules has a temperature over a predetermined temperature to discharge the coolant of the coolant tank to the pipe so that the coolant is supplied to the at least one battery module over the predetermined temperature.

When the valve is opened, the at least one flux supplement unit may supply the coolant to the coolant tank connected to the opened valve unit so as to prevent the flux of the coolant input to the battery module over the predetermined temperature from decreasing as the amount of the coolant in the coolant tank is reduced.

The at least one flux supplement unit may have an internal flow path for the flow of the coolant and connect the coolant tank of the battery rack to the coolant tank of at least one battery rack adjacent thereto.

The at least one flux supplement unit may include a connection pipe having the internal flow path and formed in a predetermined length; and at least one flow valve provided to the connection pipe to open or close the internal flow path.

Each of the plurality of battery racks may include at least one temperature sensor provided to the rack case to sense the temperature of the plurality of battery modules.

Each of the plurality of battery racks may include a control unit electrically connected to the at least one temperature sensor, the valve unit and the at least one flux supplement unit to control operations of the valve unit and the flux supplement unit.

The flux supplement unit may be provided in plural to connect the coolant tanks of the plurality of battery racks.

The plurality of flux supplement units may be disposed along at least one direction of the plurality of battery racks.

The pipe may include a main pipe connected to the valve unit; and a plurality of module pipes connected to the main pipe and respectively connected to the plurality of battery modules.

The coolant may be water.

Advantageous Effects

According to various embodiments as above, it is possible to provide an energy storage system, which may more quickly prevent propagation of flame and heat to adjacent battery modules when ignition occurs in at least one of battery modules.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
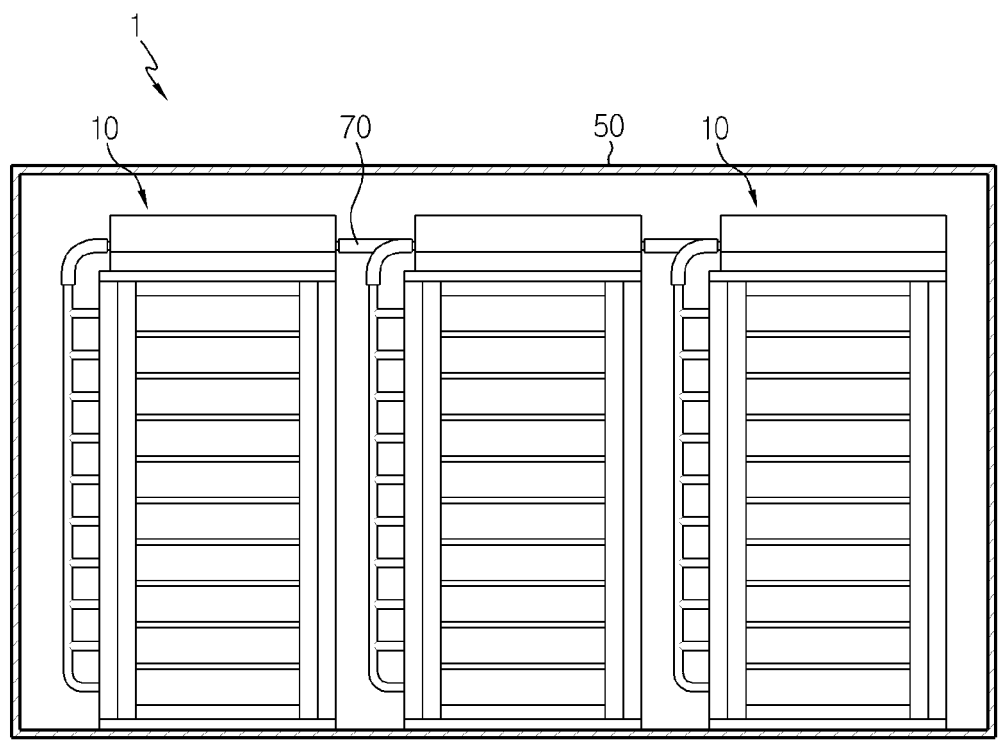
FIG. 1 is a diagram for illustrating an energy storage system according to an embodiment of the present disclosure.
Figure 2:
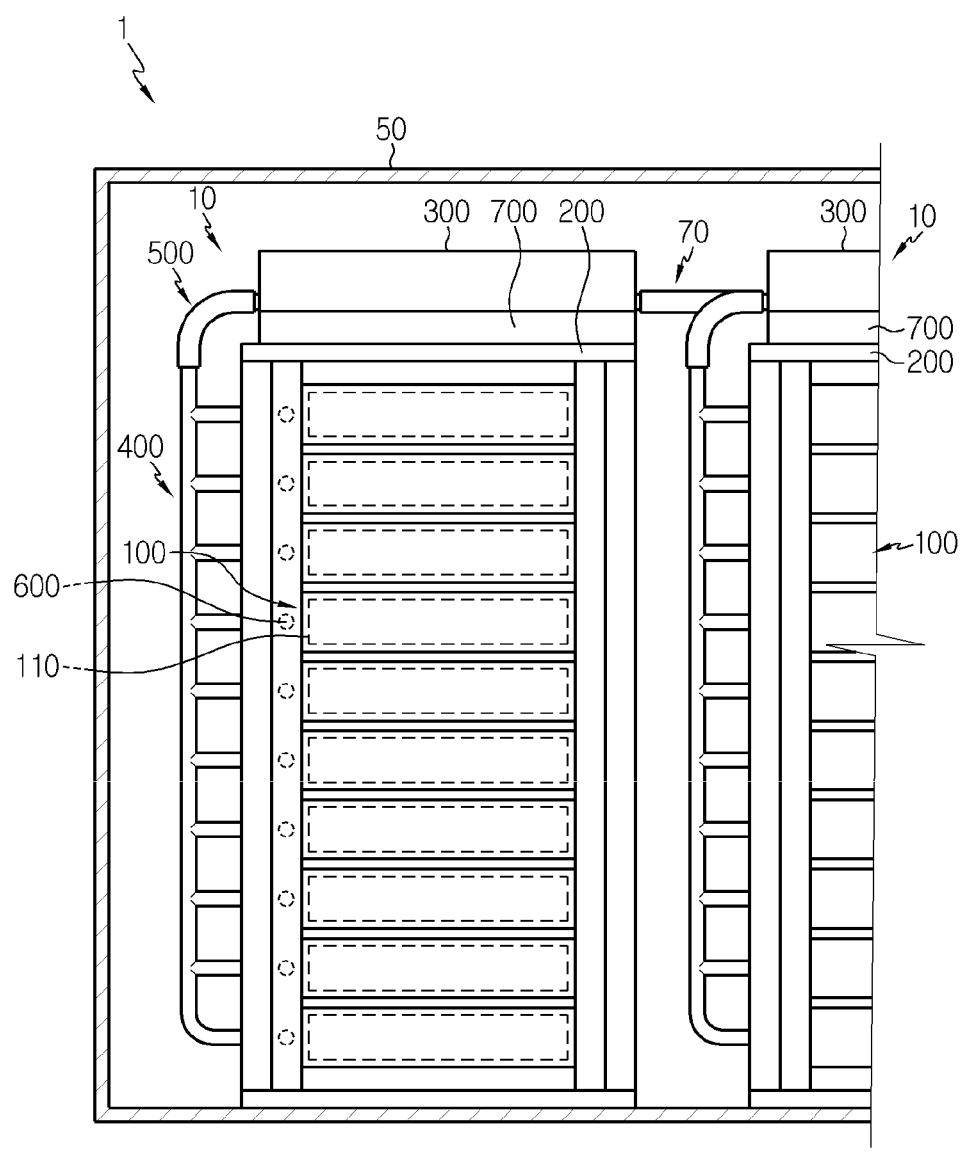
FIG. 2 is a diagram for illustrating a battery rack of the energy storage system of FIG. 1.
Figure 3:
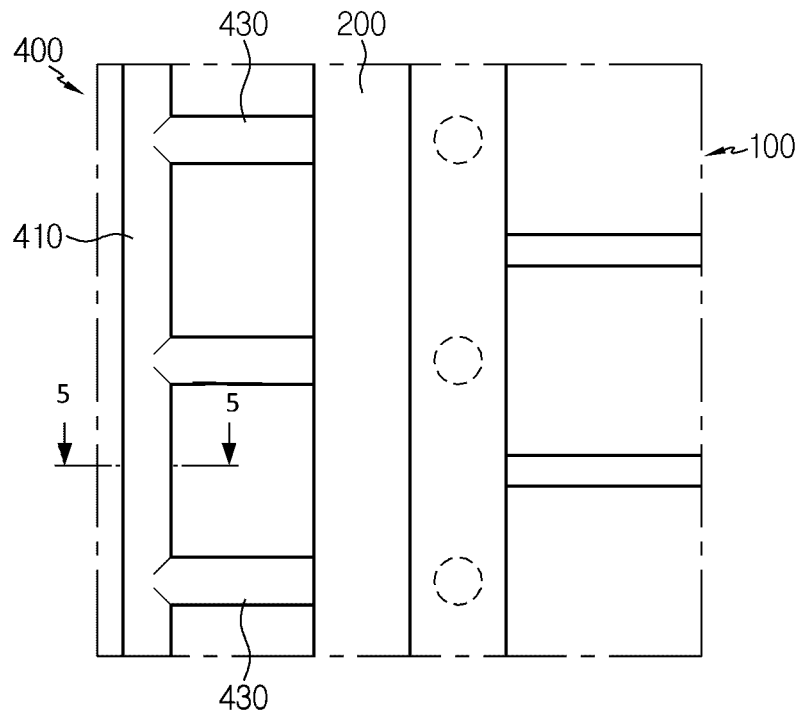
FIG. 3 is a diagram for illustrating a pipe unit of the battery rack of the energy storage system of FIG. 2.
Figure 4:
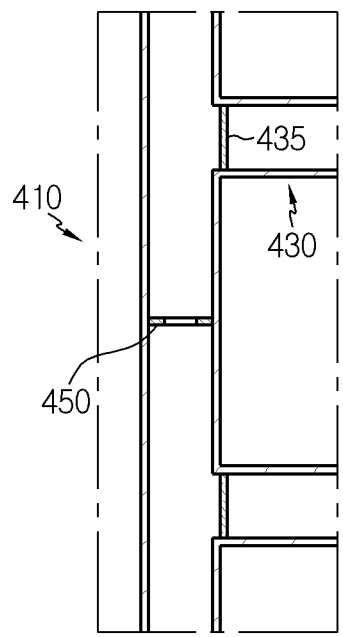
FIG. 4 is a partially sectioned view showing the pipe unit of FIG. 3.
Figure 5:
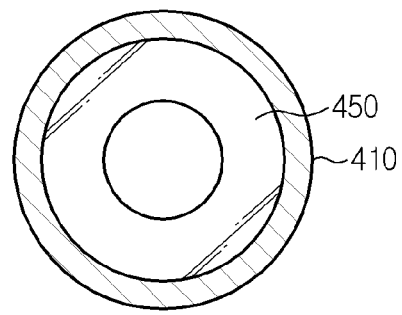
FIG. 5 is a sectioned view showing the pipe unit of FIG. 3, taken along the line 5-5.
Figure 6:
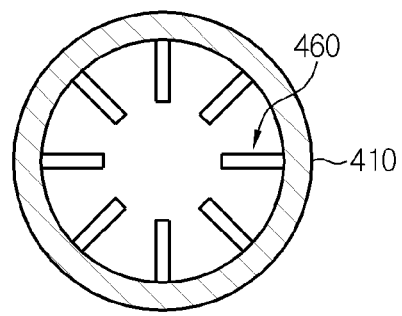
FIGS. 6 and 7 are diagrams for illustrating hydraulic pressure adjusting units according to various embodiments of the pipe unit of FIG. 3.
Figure 7:
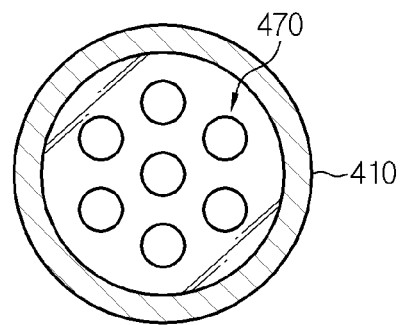
Figure 8:
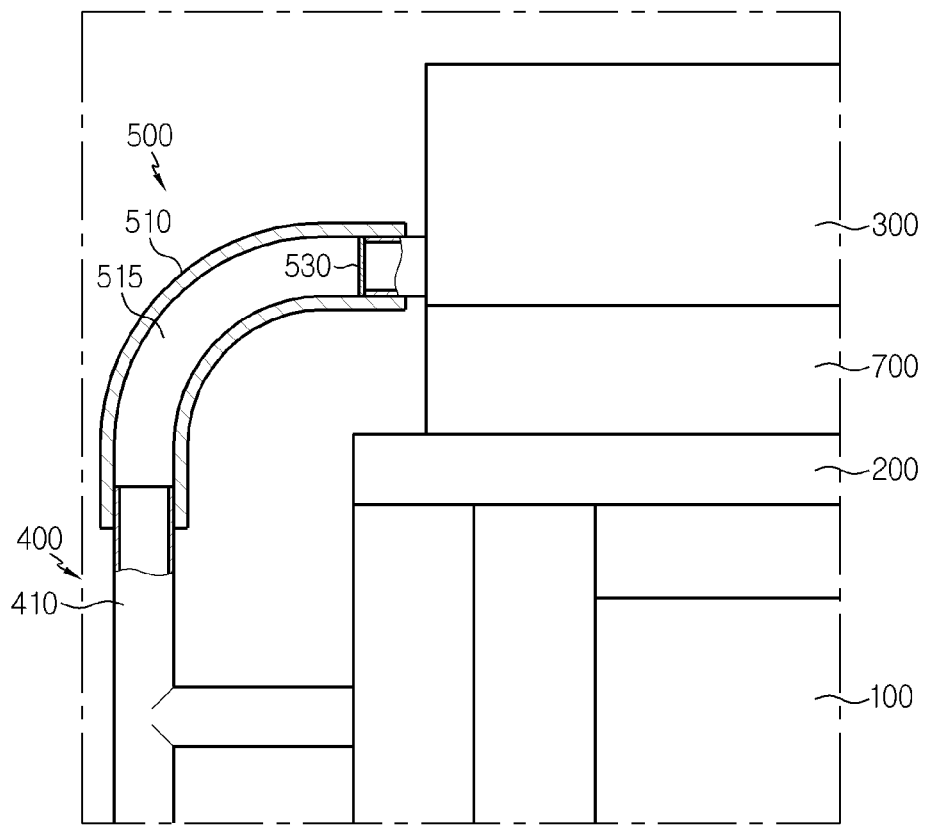
FIG. 8 is a diagram for illustrating a valve unit of the battery rack of FIG. 2.
Figure 9:
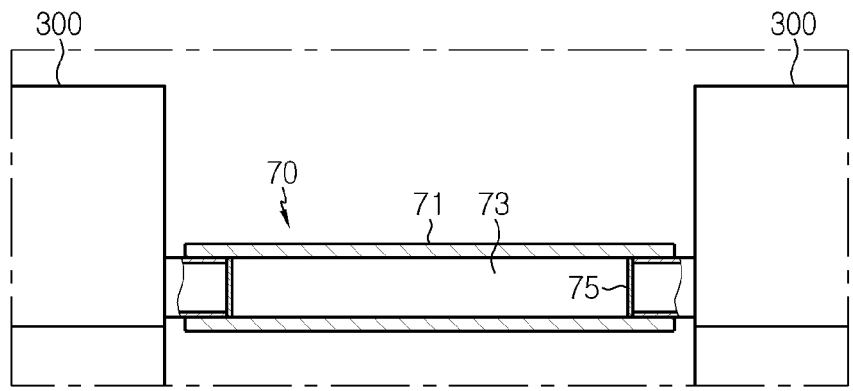
FIG. 9 is a diagram for illustrating a flux supplement unit of the energy storage system of FIG. 1.
Figure 10:
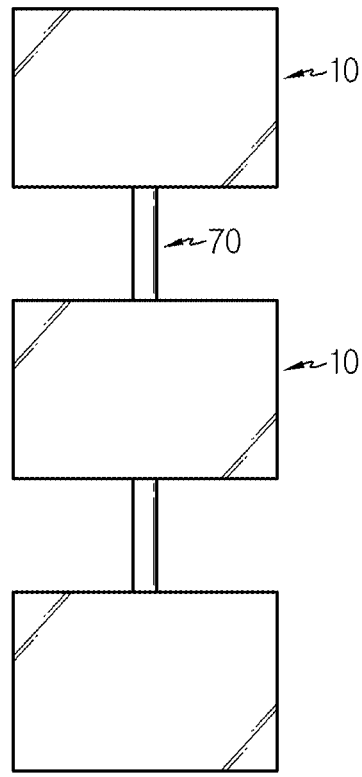
FIGS. 10 and 11 are diagrams for illustrating various connection patterns of the flux supplement unit of the energy storage system of FIG. 1.
Figure 11:
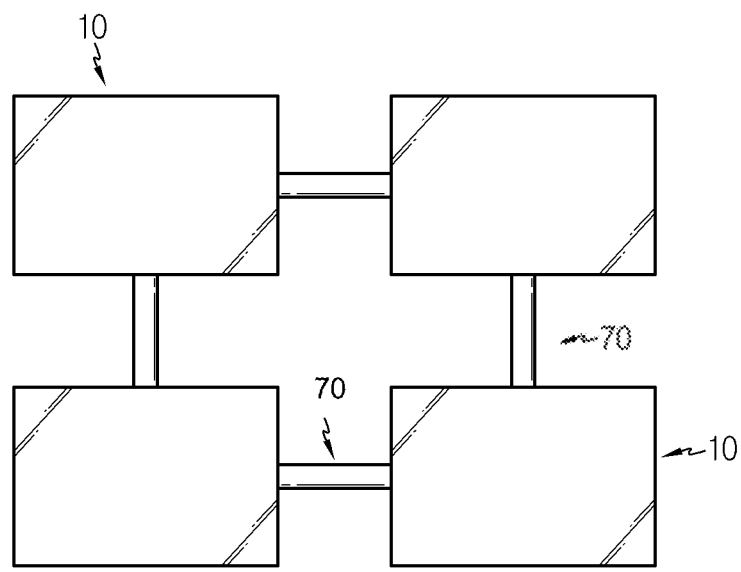

FIG. 1 is a diagram for illustrating an energy storage system according to an embodiment of the present disclosure, FIG. 2 is a diagram for illustrating a battery rack of the energy storage system of FIG. 1, FIG. 3 is a diagram for illustrating a pipe unit of the battery rack of the energy storage system of FIG. 2, FIG. 4 is a partially sectioned view showing the pipe unit of FIG. 3, FIG. 5 is a sectioned view showing the pipe unit of FIG. 3, taken along the line 5-5, FIGS. 6 and 7 are diagrams for illustrating hydraulic pressure adjusting units according to various embodiments of the pipe unit of FIG. 3, FIG. 8 is a diagram for illustrating a valve unit of the battery rack of FIG. 2, FIG. 9 is a diagram for illustrating a flux supplement unit of the energy storage system of FIG. 1, and FIGS. 10 and 11 are diagrams for illustrating various connection patterns of the flux supplement unit of the energy storage system of FIG. 1.

Referring to FIGS. 1 to 11, an energy storage system 1 is an energy source and may be used for home or industrial use. The energy storage system 1 may include a plurality of battery racks 10, a rack container 50, and a flux supplement unit 70.

The plurality of battery racks 10 may be disposed in a rack container 50, explained later. The plurality of battery racks 10 may include two or more battery racks.

Each of the plurality of battery racks 10 may include a battery module 100, a rack case 200, a coolant tank 300, a pipe unit 400, a valve unit 500, a temperature sensor 600, and a control unit 700.

The battery module 100 may be provided in plural. The plurality of battery modules 100 may be stacked on each other along an upper and lower direction of the battery rack 10. Each of the plurality of battery modules 100 may include at least one battery cell 110. Hereinafter, in this embodiment, each of the plurality of battery modules 100 will be described as including a plurality of battery cells 110.

The plurality of battery cells 110 may be provided as secondary batteries, respectively. Specifically, the plurality of battery cells 110 may include at least one of pouch-type secondary batteries, rectangular secondary batteries, and cylindrical secondary batteries. Hereinafter, in this embodiment, it will be described that the plurality of battery cells 110 are pouch-type secondary batteries.

The rack case 200 may accommodate the plurality of battery modules 100. The rack case 200 may accommodate the plurality of battery modules 100 to be stacked on each other in an upper and lower direction.

The coolant tank 300 may be provided to an upper side of the rack case 200. The coolant tank 300 may contain a predetermined coolant therein. Accordingly, an accommodation space capable of accommodating the coolant may be provided in the coolant tank 300. Here, the coolant may be provided as a liquid coolant. As an example, the coolant may be water. Hereinafter, in this embodiment, the coolant will be described as water.

The pipe unit 400 may connect the coolant tank 300 and the plurality of battery modules 100. The pipe unit 400 may guide the coolant of the coolant tank 300, namely the water, to be supplied to the plurality of battery modules 100.

The pipe unit 400 may include a main pipe 410, a module pipe 430, and a hydraulic pressure adjusting unit 450.

The main pipe 410 is connected to a valve unit 500, explained later, and may be elongated to have a predetermined length along an upper and lower direction of the rack case 200. The main pipe 410 may be spaced apart from the rack case 200 by a predetermined interval.

The module pipe 430 is connected to the main pipe 410 and may be disposed in a horizontal direction from the main pipe 410. The module pipe 430 is provided in plural, and the plurality of module pipes 430 may be connected to the battery modules 100, respectively.

The plurality of module pipes 430 may be disposed to be spaced apart from each other by a predetermined distance along the upper and lower direction of the rack case 200. The plurality of module pipes 430 may connect the main pipe 410 and the plurality of battery modules 100 to each other.

Each of the plurality of module pipes 430 may include a module valve 435.

The module valve 435 may be provided to an internal flow path of each module pipe 430 to opened and closed. The module valve 435 may be electrically connected to a control unit 700, explained later. Each module valve 435 may be operated to open or close the internal flow path of the module pipe 430 according to the control of the control unit 700, explained later.

Meanwhile, the module valve 435 may also be configured to be opened or closed in a manner other than the control of the control unit 700. As an example, the module valve 435 may be provided as a member that is melted down or cut off at a preset temperature or above to open the internal flow path of the module pipe 430 when the battery module 100 is abnormally heated, in a state of being mounted in the module pipe 430 to close the internal flow path of the module pipe 430.

The hydraulic pressure adjusting unit 450 is for adjusting a hydraulic pressure according to the height of the main pipe 410, and may be provided to an inner wall of the main pipe 410. Specifically, the hydraulic pressure adjusting unit 450 may be provided in plural, and the plurality of hydraulic pressure adjusting units 450 may be disposed between the plurality of module pipes 430, respectively, in the upper and lower direction of the main pipe 410.

The plurality of hydraulic pressure adjusting units 450 may be formed to protrude by a predetermined length from the inner wall of the main pipe 410 toward a central portion of the main pipe 410. The inner diameter of the main pipe 410 having the plurality of hydraulic pressure adjusting units 450 may be relatively reduced smaller than the inner diameter of the main pipe 410 not having the plurality of hydraulic pressure adjusting units 450. Accordingly, a pipe loss may occur in the space of the main pipe 410 having the plurality of hydraulic pressure adjusting units 450 between the plurality of module pipes 430. When the water flows through the main pipe 410, this pipe loss offsets the pressure increased by gravity, so that the water may be supplied more evenly regardless of the height at any place of the plurality of module pipes 430.

That is, since the hydraulic pressure is adjusted according to the height of the main pipe 410 by means of the plurality of hydraulic pressure adjusting units 450, when the water is supplied, the water may be fed evenly at any place of the plurality of battery modules 100, including an upper side, a lower side and a center side of the plurality of battery modules 100. Consequently, the plurality of hydraulic pressure adjusting units 450 may guide the water to be input with a uniform flux regardless of the height of the battery modules 100.

Meanwhile, the plurality of hydraulic pressure adjusting units 450 may also have other structures capable of causing a piping loss of the main pipe 410. That is, as shown in FIG. 6, a plurality of hydraulic pressure adjusting units 460 may be provided as a plurality of ribs that protrude from the inner wall of the main pipe 410 toward the center of the main pipe 410 in a radial direction, and, as shown in FIG. 7, a plurality of hydraulic pressure adjusting units 470 may be provided in a disk shape in which a plurality of holes are formed.

The valve unit 500 is provided between the pipe unit 400 and the coolant tank 300, and when at least one battery module 100 among the plurality of battery modules 100 has a predetermined temperature or above, the valve unit 500 may be opened to feed the water in the coolant tank 300 to the pipe unit 400 so that the water is supplied to the plurality of battery modules 100.

The valve unit 500 may include a valve body 510 and an opening/closing valve 530.

The valve body 510 may connect the coolant tank 300 and the pipe unit 400. A valve flow path 515 for the flow of the water may be provided inside the valve body 510.

The opening/closing valve 530 is provided to be opened and closed in the valve body 510, and may be disposed near the coolant tank 300. The opening/closing valve 530 may close the valve flow path 515 when the temperature of the plurality of battery modules 100 is lower than a predetermined temperature, and open the valve flow path 515 when the temperature of at least one battery module 100 among the plurality of battery modules 100 is higher than the predetermined temperature.

The temperature sensor 600 is provided to the rack case 200, and may sense the temperature of the plurality of battery modules 100. The temperature sensor 600 may be provided in plural. The plurality of temperature sensors 600 may be disposed close to the battery modules 100, respectively.

The control unit 700 may be electrically connected to various the plurality of battery modules 100, the coolant tank 300, the plurality of temperature sensors 600, the module valve 435, the valve unit 500, a flow valve 75 of the flux supplement unit 70, explained later, and various electric components of the battery rack 10 to control the operations of the battery rack 10 and the flux supplement unit 70. For example, when a fire occurs due to abnormal heat generation of at least one battery module 100 among the plurality of battery modules 100, the control unit 700 may control the operation of the opening/closing valve 530 of the valve unit 500, the operation of the module valve 435 of the module pipe 430 connected to the at least one battery module 100 at which the abnormal heat generation occurs, and the operation of the flow valve 75 of the flux supplement unit 70.

Seeing the configuration of the energy storage system 1 again, the rack container 50 may accommodate the plurality of battery racks 10. To this end, the rack container 50 may have a predetermined accommodation space capable of accommodating the plurality of battery racks 10.

The flux supplement unit 70 may connect the coolant tanks 300 of the plurality of battery racks 10 to each other. When the valve unit 500 of the at least one battery rack 10 is opened, the flux supplement unit 70 may guide the water to be supplied to the coolant tank 300 connected to the opened valve unit 500, in order to prevent the flux of water flowing into the battery module 100 at the predetermined temperature or above from decreasing as the water in the coolant tank 300 of the at least one battery rack 10 where the valve unit 500 is opened is reduced.

The flux supplement unit 70 may connect the coolant tank 300 of at least one battery rack 10 among the plurality of battery racks 10 and the coolant tank 300 of at least one other battery rack 10 adjacent to the coolant tank 300 of the at least one battery rack 10 to each other.

Here, the flux supplement unit 70 may be connected to a lower end of the coolant tanks 300 of the battery rack 10. Accordingly, when the flux supplement unit 70 is opened, the flow of water from one coolant tank 300 to another coolant tank 300 may be naturally performed by potential energy due to gravity.

At least one flux supplement unit 70 or a plurality of flux supplement units 70 may be provided. Hereinafter, in this embodiment, the flux supplement unit 70 will be described as being provided in plural.

The plurality of flux supplement units 70 may be provided to connect the coolant tanks 300 of the plurality of battery racks 10, and may be disposed along at least one direction. For example, as shown in FIG. 10, the plurality of flux supplement units 70 may be arranged in a one-dimensional shape along one direction of the plurality of battery racks 10, namely the upper and lower direction. Meanwhile, as shown in FIG. 11, the plurality of flux supplement units 70 may also be arranged in a two-dimensional shape in an upper and lower direction and a left and right direction according to the arrangement shape of the plurality of battery racks 10. This is merely an example, and the plurality of flux supplement units 70 may be arranged in more diverse and flexible patterns according to the arrangement shape of the plurality of battery racks 10.

Hereinafter, the plurality of flux supplement units 70 will be described in more detail.

Each of the plurality of flux supplement units 70 may include a connection pipe 71 and a flow valve 75.

The connection pipe 71 is formed with a predetermined length and may have an internal flow path 73 for the flow of the water. The connection pipe 71 may be connected to the coolant tanks 300 of adjacent battery racks 10 to communicate therewith.

At least one flow valve 75 may be provided, and the at least one flow valve 75 may be provided to the connection pipe 71 to open and close the internal flow path 73. The flow valve 75 may be electrically connected to the control unit 700, and may be opened and closed according to the control of the control unit 700.

Hereinafter, the operation of the energy storage system 1 when at least one battery module 100 of the battery racks 10 of the energy storage system 1 according to this embodiment is abnormally heated will be described in more detail.

FIGS. 12 to 17 are diagrams for illustrating an operation of the energy storage system when at least one battery module of the battery rack of the energy storage system of FIG. 1 is abnormally heated.

Figure 12:
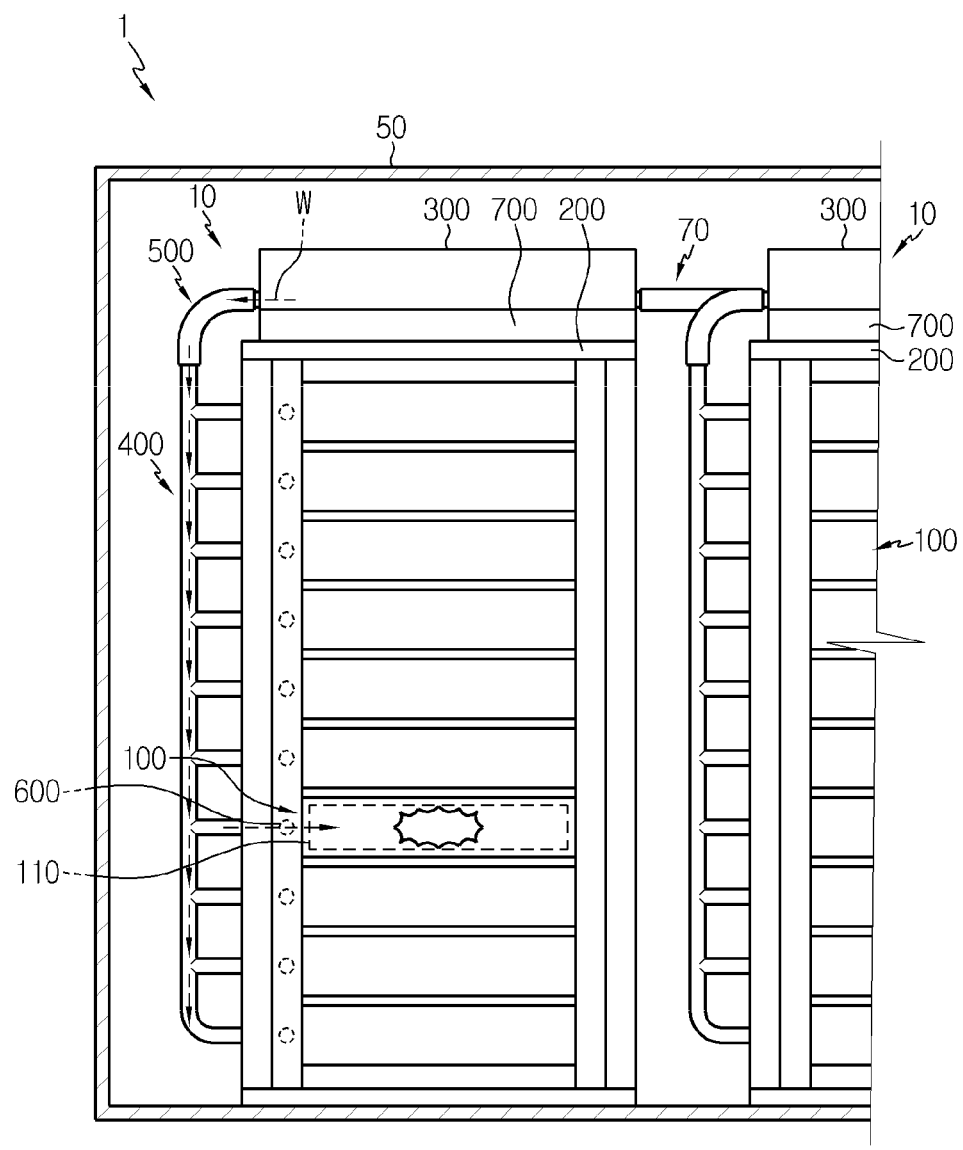
FIGS. 12 to 17 are diagrams for illustrating an operation of the energy storage system when at least one battery module of the battery rack of the energy storage system of FIG. 1 is abnormally heated.
Figure 13:
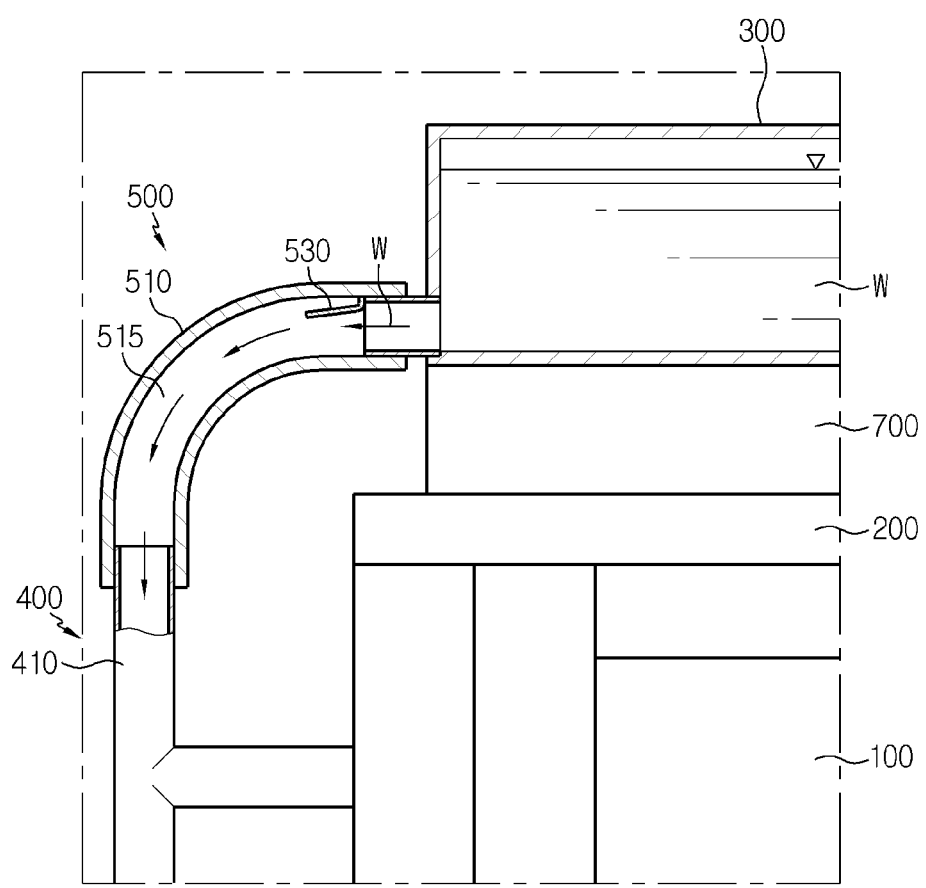
Figure 14:
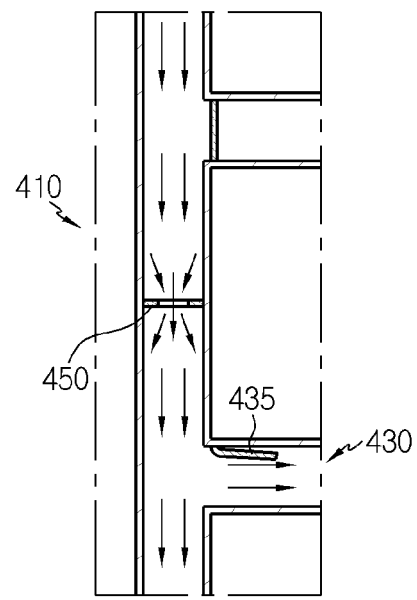

Referring to FIGS. 12 to 14, in the energy storage system 1, temperature may increase rapidly due to abnormal heat generation in at least one battery module 100 among the plurality of battery modules 100 of the plurality of battery racks 10. When a fire occurs in the battery module 100 that is abnormally heated, if the fire is transferred to adjacent battery modules 100, a greater risk such as explosion of the entire battery racks 10 may occur, so it is needed to rapidly block the transfer of the fire. That is, when at least one of the battery modules 100 ignites, it is necessary to more quickly block the propagation of flame and heat toward adjacent battery modules 100.

In this embodiment, when the temperature rises due to abnormal heat generation in at least one battery module 100 among the plurality of battery modules 100 of the battery rack 10, first, the temperature sensor 600 near the battery module 100 whose temperature rises due to abnormal heat generation or the like may sense the temperature rise. After that, if the temperature sensed by the temperature sensor 600 is higher than a preset predetermined temperature, the control unit 700 may open the opening/closing valve 530 of the valve unit 500 and the module valve 435 of the module pipe 430 connected to the battery module 100 that is heated over the preset predetermined temperature.

As the opening/closing valve 530 of the valve unit 500 is opened, the water W contained in the coolant tank 300 may be supplied to the pipe unit 400 along the valve flow path 515 of the valve body 510 of the valve unit 500.

After that, the water W supplied to the main pipe 410 of the pipe unit 400 may flow toward the module pipe 430 at which the module valve 435 is opened, among the plurality of module pipes 430, and be supplied to the battery module 100 that is heated abnormally.

Accordingly, the water is supplied to the battery module 100 that is abnormally heated, so that the battery module 100 having the abnormal heat may be cooled more quickly. That is, in this embodiment, by using the water in the coolant tank 300, when a situation such as abnormal heat occurs, emergency cooling may be implemented by supplying the water to the battery module 100 that is abnormally heated. Thus, when at least one of the battery modules 100 ignites, the propagation of flame and heat to adjacent battery modules 100 may be prevented more quickly.

Meanwhile, when the water is supplied, the plurality of hydraulic pressure adjusting units 450 provided to the main pipe 410 may adjust the hydraulic pressure according to the height of the main pipe 410 so that the is supplied with the same flux at any place of the plurality of battery modules 100. That is, in this embodiment, it is possible to guide the water W to be input evenly regardless of the height of the stacked battery modules 100 by means of the plurality of hydraulic pressure adjusting units 450.

In other words, when supplying water for cooling the abnormally heated battery module 100, the water may be guided to be input with a uniform flux by means of the hydraulic pressure adjusting units 450 regardless of the stack height, even though the stack height is different, for example in a case where a battery module 100 at an upper side is abnormally heated among the stacked battery modules 100, in a case where a battery module 100 at a lower side is abnormally heated, in a case where a battery module 100 at the center is abnormally heated, or the like.

By using the plurality of hydraulic pressure adjusting units 450 as described above, the water supplied when the battery module 100 stacked at an upper side is abnormally heated, the water supplied when the battery module 100 stacked at a lower side is abnormally heated, and the water supplied when the battery module 100 stacked at the center may be supplied with a uniform flux.

Figure 15:
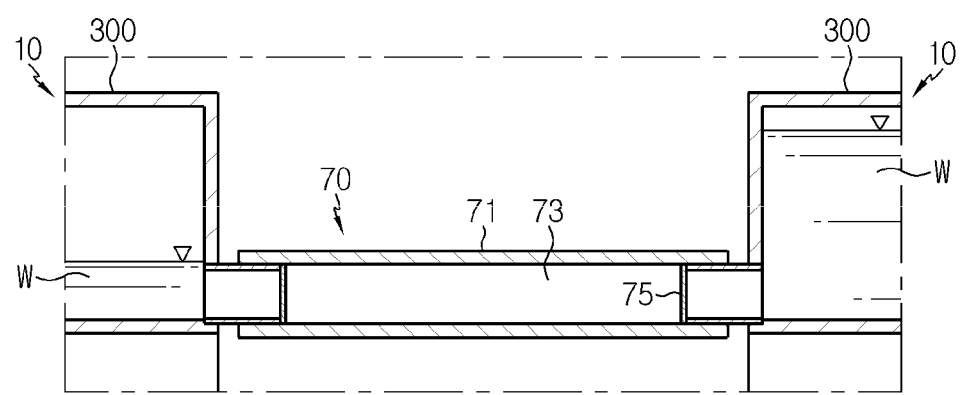
Figure 16:
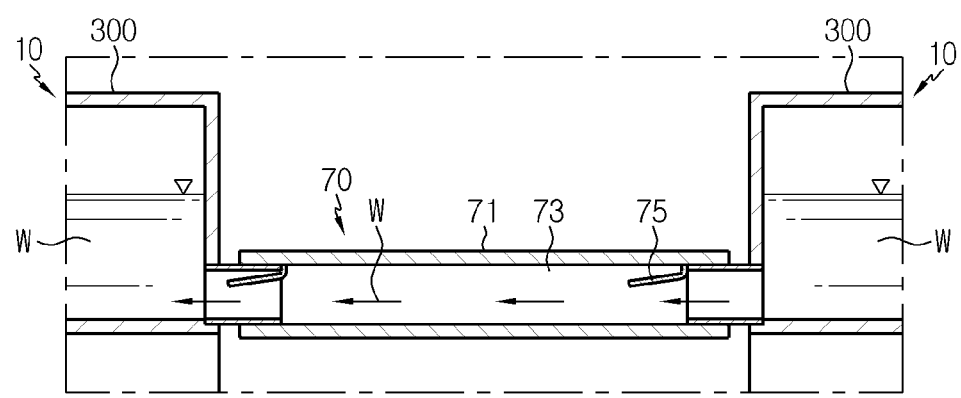
Figure 17:
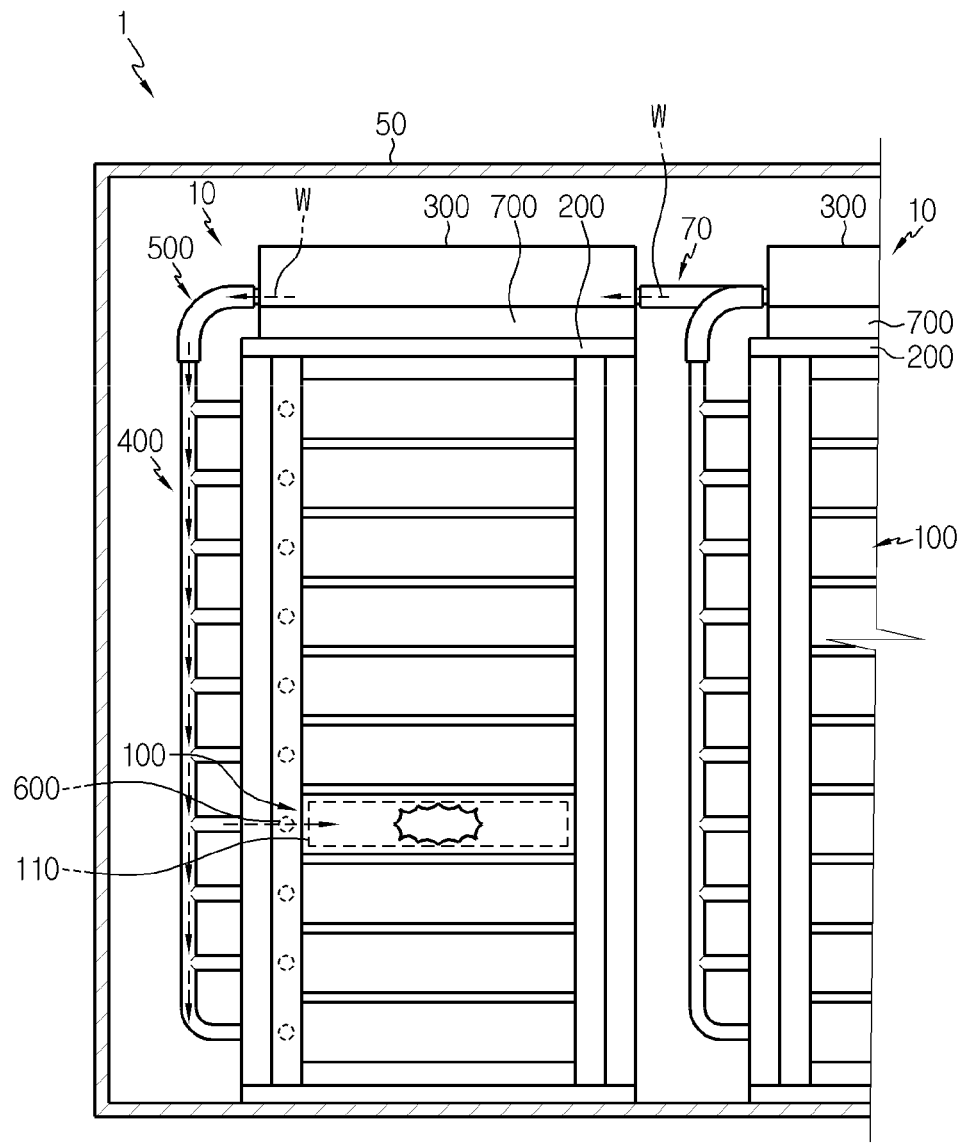

Referring to FIGS. 15 to 17, when the water W is supplied to the battery module 100 that is abnormally heated, the amount of the water W inside the coolant tank 300 that supplies the water W may be reduced.

When of emergency cooling is performed to the battery module 100 that is abnormally heated, it is important that the water is input with the same flux for a certain period of time in order to maintain the cooling performance. If the amount of water contained in the coolant tank 300 that supplies the water W decreases, the hydraulic pressure decreases and the flux of water supplied to the abnormally heated battery module 100 may also decrease.

In this embodiment, in this case, the control unit 700 may detect the amount of water W in the coolant tank 300 that supplies the water W. If the amount of water W in the coolant tank 300 that supplies the water W to the abnormally heated battery module 100 is less than a preset predetermined amount, water W may be supplied from the coolant tank 300 of an adjacent battery rack 10 to the coolant tank 300 in which the amount of water is less than the preset predetermined amount.

Specifically, the control unit 700 may open the flow valve 75 of the flux supplement unit 70 to communicate the coolant tank 300 in which the amount of water is less than the preset predetermined amount with an adjacent coolant tank 300. Accordingly, the water W of the adjacent coolant tank 300 may flow along the internal flow path 73 of the connection pipe 71 of the flux supplement unit 70 and be supplied to the coolant tank 300 in which the amount of water is less than the preset predetermined amount.

Accordingly, the coolant tank 300, which discharges the water W for emergency cooling, may be supplemented with the water W from the adjacent coolant tank 300 through the flux supplement unit 70, so that the water W may be continuously supplied to the abnormally heated battery module 100 for a certain period of time with the same flux.

Therefore, in this embodiment, when emergency cooling is performed to the battery module 100 that is abnormally heated, water may be input with the same flux for a certain period of time by means of the flux supplement unit 70, so the cooling performance may be maintained for a certain time during the emergency cooling.

According to various embodiments as above, it is possible to provide an energy storage system 1, which may more quickly prevent propagation of flame and heat to adjacent battery modules 100 when ignition occurs in at least one of battery modules 100.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. An energy storage system, comprising:
    a rack container having a predetermined accommodation space;
    a plurality of battery racks disposed in the rack container, each of the plurality of battery racks comprising:
        a coolant tank in which a predetermined coolant is contained;
        a plurality of battery modules stacked on each other along in a vertical direction of the battery rack, each of the plurality of battery modules having at least one battery cell; and
        a pipe configured to connect the coolant tank and the plurality of battery modules; and
    at least one flux supplement unit having a first end connected to the coolant tank of a first battery rack of the plurality of battery racks and a second end connected to the coolant tank of a second battery rack of the plurality of battery racks,
    wherein the at least one flux supplement unit allows fluid flow out of the coolant tank of the first battery rack and into the coolant tank of the second battery rack, and
    wherein the coolant tank has a first port connected to the pipe and a second port connected to the at least one flux supplement unit.

2. The energy storage system according to claim 1, wherein each of the plurality of battery racks includes:
    a rack case configured to accommodate the plurality of battery modules, the coolant tank being provided to an upper side of the rack case; and
    a valve provided between the pipe and the coolant tank and configured to be opened when at least one battery module of the plurality of battery modules has a temperature over a predetermined temperature to discharge the coolant of the coolant tank to the pipe so that the coolant is supplied to the at least one battery module over the predetermined temperature.

3. The energy storage system according to claim 2, wherein when the valve is opened, the at least one flux supplement unit supplies the coolant to the coolant tank connected to the valve so as to prevent a flux of the coolant input to the battery module over the predetermined temperature from decreasing as the amount of the coolant in the coolant tank is reduced.

4. The energy storage system according to claim 3, wherein the at least one flux supplement unit has an internal flow path for a flow of the coolant and connects the coolant tank of the battery rack to the coolant tank of at least one battery rack adjacent thereto.

5. The energy storage system according to claim 4, wherein the at least one flux supplement unit includes:
    a connection pipe having the internal flow path and formed in a predetermined length; and
    at least one flow valve provided to the connection pipe to open or close the internal flow path.

6. The energy storage system according to claim 3, wherein each of the plurality of battery racks includes at least one temperature sensor provided to the rack case to sense the temperature of the plurality of battery modules.

7. The energy storage system according to claim 6, wherein each of the plurality of battery racks includes a control unit electrically connected to the at least one temperature sensor, the valve and the at least one flux supplement unit to control operations of the valve and the flux supplement unit.

8. The energy storage system according to claim 3, wherein the flux supplement unit is provided in plural to connect the coolant tanks of the plurality of battery racks.

9. The energy storage system according to claim 8, wherein the plurality of flux supplement units are disposed along at least one direction of the plurality of battery racks.

10. The energy storage system according to claim 2, wherein the pipe includes:
    a main pipe connected to the valve; and
    a plurality of module pipes connected to the main pipe and respectively connected to the plurality of battery modules.

11. The energy storage system according to claim 1, wherein the coolant is water.

12. The energy storage system according to claim 1, wherein the at least one flux supplement unit is a plurality of flux supplement units,
    wherein each of the plurality of battery racks is connected to at least one of the plurality of flux supplement units.

13. The energy storage system according to claim 1, wherein the at least one flux supplement unit is a plurality of flux supplement units,
    wherein each of the plurality of battery racks is connected to at least two of the plurality of flux supplement units.

* * * * *